United States Patent
Li (10) Patent No.: US 10,872,337 B2
(45) Date of Patent: Dec. 22, 2020

(54) PAYMENT DEVICE AND SYSTEM (71) Applicant: TENDYRON CORPORATION, Beijing (CN)

(72) Inventor: Ming Li, Beijing (CN)

(73) Assignee: Tendyron Corporation, Beijing (CN)

( * ) Notice: Subject to any disclaimer, the term of this patent is extended or adjusted under 35 U.S.C. 154(b) by 87 days.

(21) Appl. No.: 16/082,697

(22) PCT Filed: Mar. 6, 2017

(86) PCT No.: PCT/CN2017/075741
§ 371 (c)(1),
(2) Date: Sep. 6, 2018

(87) PCT Pub. No.: WO2017/152818
PCT Pub. Date: Sep. 14, 2017

(65) Prior Publication Data
US 2019/0095926 A1 Mar. 28, 2019

(30) Foreign Application Priority Data
Mar. 7, 2016 (CN) .......................... 2016 1 0127251

(51) Int. Cl.
*G06F 21/32* (2013.01)
*G06F 21/40* (2013.01)
(Continued)

(52) U.S. Cl.
CPC ....... *G06Q 20/40145* (2013.01); *G06F 21/32* (2013.01); *G06F 21/40* (2013.01);
(Continued)

(58) Field of Classification Search
CPC ............................................... G06Q 20/40145
See application file for complete search history.

(56) References Cited

U.S. PATENT DOCUMENTS

| 9,171,233 B2* | 10/2015 | Miura ...................... G06K 9/00 |
| 2010/0042835 A1* | 2/2010 | Lee ...................... H04L 63/0861 |
| | | 713/168 |

(Continued)

FOREIGN PATENT DOCUMENTS

| CN | 102930436 A | 2/2013 |
| CN | 103679453 A | 3/2014 |

(Continued)

OTHER PUBLICATIONS

Jadhev, "Proposed E-Payment System Using Biometrics," International Journal of Computer Science and Information Technology, vol. 6, 2015 (Year: 2015).*

(Continued)

*Primary Examiner* — Olabode Akintola
*Assistant Examiner* — Brandon M Duck
(74) *Attorney, Agent, or Firm* — Martin & Ferraro, LLP (57) ABSTRACT

A payment method and a payment system are disclosed. After a biological body enters a predetermined range of a payee device, a communication connection is established by a payee device with a payer device through the biological body, and transaction information is transmitted to the payer device. The transaction information is received by the payer device, key information is extracted and is prompted, and authentication information is transmitted to the payee device after receiving a confirmation instruction. The authentication information is received by the payee device and biological feature information about the biological body is acquired during a time duration when the biological body is within the predetermined range. An authentication result for authenticating the digital authentication information and the biological feature information is acquired by the payee device, and payment transaction is performed when the authentication result is a successful authentication.

15 Claims, 1 Drawing Sheet

(51) Int. Cl.
    *G06Q 20/10*     (2012.01)
    *G06Q 20/40*     (2012.01)
    *G06Q 20/42*     (2012.01)
    *H04B 13/00*     (2006.01)

(52) U.S. Cl.
    CPC .......... *G06Q 20/102* (2013.01); *G06Q 20/40* (2013.01); *G06Q 20/42* (2013.01); *H04B 13/00* (2013.01)

(56) References Cited

U.S. PATENT DOCUMENTS

| | | | | |
|---|---|---|---|---|
| 2013/0185779 A1* | 7/2013 | Tamai | ................... | H04L 9/3228 |
| | | | | 726/6 |
| 2015/0149310 A1* | 5/2015 | He | ....................... | H04B 5/0012 |
| | | | | 705/21 |

FOREIGN PATENT DOCUMENTS

| CN | 103731273 A | 4/2014 |
|---|---|---|
| CN | 104484804 A | 4/2015 |
| CN | 105989495 A | 10/2016 |

OTHER PUBLICATIONS

International Search Report for PCT/CN2017/075741 dated May 10, 2017.

\* cited by examiner

PAYMENT DEVICE AND SYSTEM

CROSS-REFERENCE TO RELATED APPLICATION

This is a National Phase Application under 35 USC 371 of PCT/CN2017/075741 filed Mar. 6, 2017; which claims priority to and based on Chinese Patent Application No. 201610127251.5, filed with the State Intellectual Property Office of P.R. China on Mar. 7, 2016; all of which are incorporated by reference herein in their entirety.

TECHNICAL FIELD

The present disclosure relates to the field of electronic technologies, and particular to, a payment method and a payment system.

BACKGROUND

Electronic payment has advantages of safety, high-speed and reliability, compared with cash-based payment. As a payment terminal, Point of Sale (POS for short) machines are widely used for the electronic payment. Existing POS machines read information of a cardholder recorded by a magnetic stripe of a bank card through a card reader. A transaction amount is inputted by a POS operator. The cardholder swipes the bank card on the POS machine and enters a password. The POS machine uploads related information to a bank's background to complete the transaction online.

SUMMARY

In order to achieve the above objectives, technical solutions of the present disclosure are described as follows.

Embodiments of the present disclosure provide a payment method. The payment method includes after a biological body enters a predetermined range of a payee device, establishing by the payee device, a communication connection with a payer device through the biological body; sending by the payee device, transaction information to the payer device through the communication connection; receiving by the payer device, the transaction information; extracting by the payer device, key information from the transaction information; prompting the key information by the payer device; after receiving by the payer device, a confirmation instruction from the user, sending by the payer device, authentication information to the payee device through the communication connection; receiving by the payee device, the authentication information sent by the payer device through the communication connection, the authentication information including digital authentication information; during a duration when the biological body is within the predetermined range of the payee device, collecting by the payee device, biological feature information of the biological body; acquiring by the payee device, an authentication result of authenticating the digital authentication information and the biological feature information; and performing by the payee device, a payment transaction when the authentication result is a successful authentication.

Embodiments of the present disclosure provide a payment system. The payment system includes a payee device and a payer device, in which payee device is configured to establish a communication connection with the payer device through a biological body when the biological body enters a predetermined range of the payee device, and to send transaction information to the payer device through the communication connection; the payer device is configured to receive the transaction information, to extract key information from the transaction information, to prompt the key information, and to send authentication information to the payee device through the communication connection after receiving a confirmation instruction from the user; the payee device is further configured to receive the authentication information sent by the payer device through the communication connection, the authentication information including digital authentication information, to collect biological feature information of the biological body during a duration when the biological body is within the predetermined range of the payee device, to acquire an authentication result of authenticating the digital authentication information and the biological feature information, and to perform a payment transaction when the authentication result is a successful authentication.

Embodiments of the present disclosure provide a computer program. When the computer program is running on a processor, the above payment method is executed.

BRIEF DESCRIPTION OF THE DRAWINGS

Hereinafter, some specific embodiments of the present invention will be described in detail, by way of example and not limitation, with reference to the drawings. Same or similar parts or portions are labelled with same reference numbers in the drawings. It may be understood by those skilled in the art that the drawings are not necessarily drawn to scale, in which.

DETAILED DESCRIPTION

In an existing electronic payment process, a user needs to perform two operations. A first operation is to put the bank card on the POS machine to such that the bank card establishes a connection with the POS machine, and a second operation is to input the password. Therefore, the operation process is complicated. Therefore, embodiments of the present disclosure provide a payment method, a payment system and a computer program.

Intra-body communication becomes an emerging short-distance communication technology that is mainly used to solve a communication problem in the body area network by taking a body as a carrier. The body is used as a transmission medium for electrical signals, realizing information interaction among medical equipment arranged at surface of the body, inside the body and around the body (within 3-5 meters from the body). Compared with conventional wireless communication technologies such as Bluetooth, Wireless Fidelity (WIFI for short), radio-frequency (RF for short), infrared communications or the like, signals are insusceptible of electromagnetic noise when transmitting through the body during the intra-body communication, thereby having low power consumption, high confidentiality and lower damage on the body. In addition, without a reduced efficiency caused by a multi-parties communication, a redundant wired connection inherent in a wired communication method can be avoided. Based on this, the present disclosure provides a payment method. The payment method communicates transaction information and to-beauthenticated information using the intra-body communication, and the payment is done after the to-be authenticated information is successfully authenticated. From a perspective of users, only a single operation is performed, and digital authentication information and biological feature information are simultaneously acquires by a payee device, which is quick and convenient. A dual authentication of the digital authentication information and the biological feature information may be safer and reliable, thereby reducing a probability that an actually legal user is identified unsuccessfully, and improving user experience.

Embodiments of the present disclosure will be further described in detail below with reference to the drawings.

Figure 1:
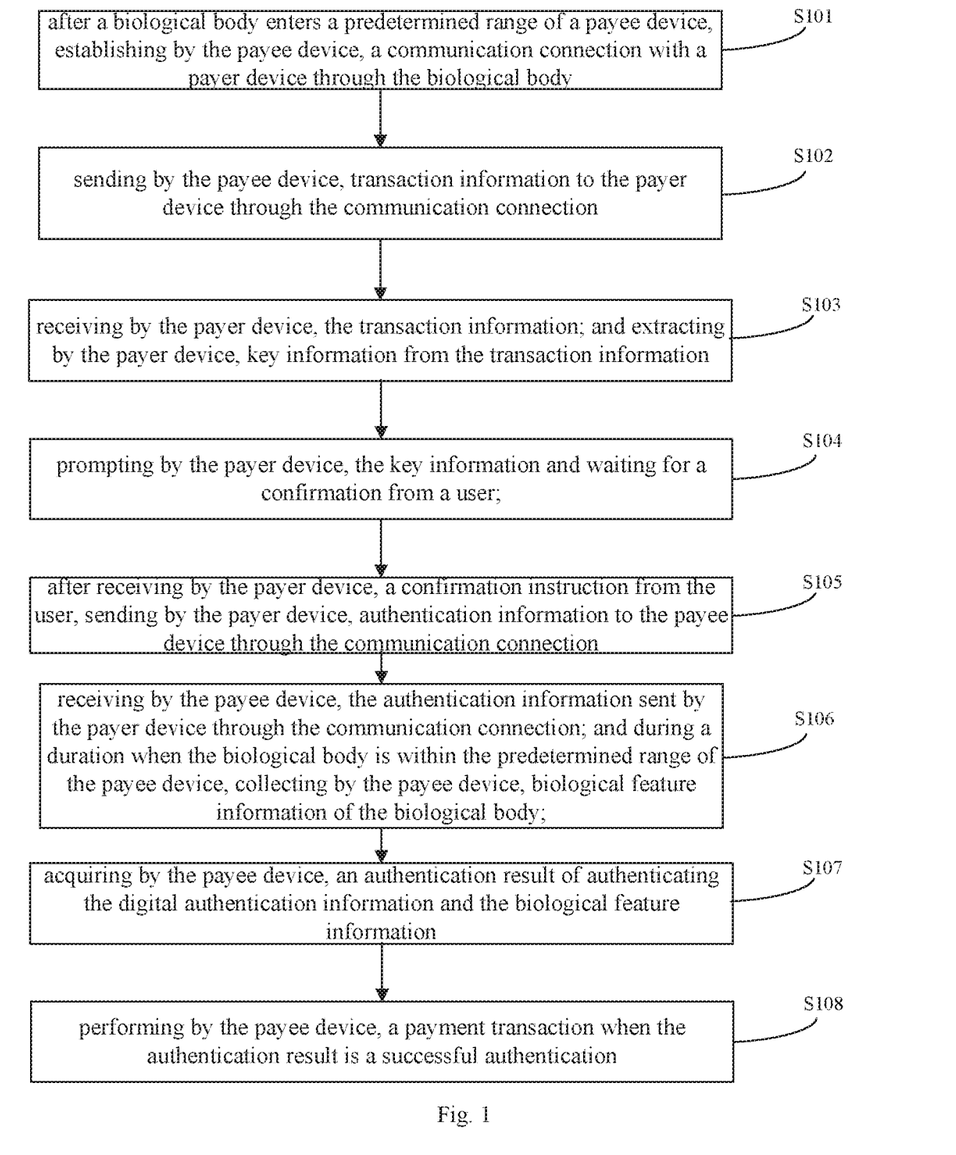
FIG. 1 is a flow chart illustrating a payment method provided in embodiment 1 of the present disclosure.

Embodiments of the present disclosure provide a payment method, as illustrated in FIG. 1. The payment method includes blocks S101 to S108.

In block S101, when a biological body enters a predetermined range of a payee device, the payee device establishes a communication connection with a payer device using the biological body.

In embodiments, the biological body generally refers to a human body. The payee device may be a payment terminal connected with a background via network, such as a POS machine, a code scanning terminal having an Alipay application, a mobile terminal, a personal digital assistance (PDA for short), a desktop computer, a laptop computer or the like. The payer device may be a device inserted into the human body, a device worn on the human body or a device placed in clothes worn by the human body. The device inserted into the human body may be for example a blood flow transducer, a pulse transducer, a body temperature transducer or the like. The device worn on the human body may be for example an electronic device wearable on the human body, such as a wrist strap, a wrist-watch, a necklace, a ring, a belt or the like. When the payer device is the device worn on the human body, a distance between the payer device and the surface of the human body (such as skin) is restricted to be within a predetermined distance (such as several millimeters), even though the payer device does not directly contact with the surface of the human body, to ensure a quality of communication when the payment device placed within the predetermined range communicates with the human body. The body area network (BAN for short) is a communication network centered to the human body and consisted of network elements related to the human body (including a personal terminal, transducers arranged on the human body, in the clothes, within a range from the human body (such as 3-5 meters), or even inside the human body, or networking equipment). Therefore, when a network element related to the human body enters the predetermined range of the payee device, the communication connection based on the body area network may be established.

As an alternative implementation of embodiments, establishing the communication connection by the payee device with the payer device using the biological body may be in a wired manner and in a wireless manner. Specifically, the establishing may be implemented in at least one of the above wired manner and the wireless manner.

The wired manner is described as follows.

Electrodes are arranged in both the payee device and the payer device. When the payee device contacts with the biological body (such as the human body) where the payer device is inserted or worn (for example, a user wearing the wrist-watch contacts with the POS machine using his finger), the human body is used as a conductor to form a conductive path inside the human body by connecting the electrodes of the payee device and the payer device. That is, the communication connection is established in the wired manner. In this manner, the payee device needs to contacts with the human body carrying the payer device.

The wireless manner is described as follows.

In the wireless manner, both of the payee device and the payer device (such as the POS machine and the wrist-watch) may detect whether an electric field changes. When one of the payee device and the payer device enters an allowable range of the intra-body communication, the other one may detect a change in field strength of the electric field and establish the communication connection therewith. Specifically, taking the payer device as an example, the payer device is worn on the human body or inserted into the human body, and an electric field is generated due to oscillation of a transmitter of the payer device. When a distance between the payer device and the payee device is within the allowable range of the intra-body communication, a receiver of the payee device may detect a change in the electric field and establish the communication connection with the payer device. In this manner, the payee device does not need to contact with the human body carrying the payer device.

The above manners utilize the human body as a transmission medium of an electrical signal, realizing the information interaction among devices arranged at the surface of the body, inside the body and near the body (such as within 3 to 5 meters from the body). Compared with the conventional wireless communication technologies, such as Bluetooth, WIFI, RF, infrared communications or the like, signals are less susceptible of electromagnetic noise when transmitting through the body during the intra-body communication, thereby having low power consumption, high confidentiality and lower damage on the body. In addition, without a reduced efficiency caused by a multi-parties communication, a redundant wired connection inherent in a wired communication method can be avoided.

In block S102, the payee device sends transaction information to the payer device through the communication connection.

In embodiments, the transaction information may include transaction amounts, payee account information and payer account information. When a high amount occurs in the transaction, the payee device needs to send the transaction information to the payer device, to inform the user of the transaction information. After the user confirms the transaction information, the payment flow may be preceded.

In addition, in practical implementations, the payer device may be a single device, such as a wrist-watch, or may include two separate devices, such as the wrist-watch and an electronic signature device (such as a Key Token of Industrial and Commercial Bank of China, a Key Token of Agricultural Bank of China or a smart card having signature function).

In block S103, the payer device receives the transaction information and extracts key information from the transaction information.

In embodiments, the payer device may extract the key information (such as transaction amount, a name of the payee device, a name of the payer device, or the like) from the transaction information, without the requirement of prompting the entire transaction information. Specifically, prompting the key information may be done by displaying it on a display screen or by playing it in voice. Particularly, a limitation that it is unable to display the entire transaction information due to a small display screen of a miniature device having the small display screen (for example the wrist-watch having the small display screen) may be overcome. As long as the key information is displayed, it may be realized to inform the user.

In block S104, the payer device prompts the key information and waits for a confirmation of the user.

In embodiments, by adding a confirmation step from the user, safety of the transaction may be improved. After the confirmation from the user by pressing a confirmation key via the user, subsequent operations may be operated. Particularly, when the payer device includes two separate devices, informing the user may be implemented by prompting the key information by any one of the two separate devices, certainly preferably, prompting by the electronic signature device.

In block S105, after receiving a confirmation instruction from the user, the payer device sends authentication information to the payee device through the communication connection.

In embodiments, the authentication information includes digital authentication information. The digital authentication information includes at least one of electronic signature information, encrypted information and one-time password. The electronic signature information is signature data obtained by signing to-be-signed data via the payer device using its privacy key. The to-be-signed data includes one-time authentication data, authentication identification information and the like. When the electronic signature information is authenticated, a public key of the payer device is acquired, and the electronic signature information is verified using the public key. When the electronic signature information is verified successfully, it is indicated that the authentication is successful. The above method for authentication is called as an asymmetric authentication method. The encrypted information is a MAC value obtained by calculating to-be-encrypted data via the payer device using a symmetric key negotiated with the payee device. When the encrypted information is authenticated, a verified MAC value is obtained by calculating the to-be-encrypted data using a symmetric key and the verified MAC value is compared with the encrypted information. When the encrypted information is identical to the verified MAC value, the authentication is successful. The above method for authentication is called as a symmetric authentication method. The one-time password is ciphertext generated by a one-time password generator (OTP for short) based on a seed key. When the one-time password is authenticated, a verified value is obtained by performing a calculation using the seed key, and the verified value is compared with the one-time password. When the one-time password is identical to the verified value, it is indicated that the authentication is successful. The above method for authentication is called as a token-based authentication method. In embodiments, the authentication of the digital authentication information may be realized in any one of above-mentioned three methods, to ensure legality of the payer device.

In an alternative implementation of embodiments, the authentication information may further include authentication identification information. The authentication identification information may be for example a device identification of the payer device, a user identity (ID) or other information that may uniquely identify the user. Through the authentication identification information, an authentication factor which is used for authenticating the digital authentication information and the biological feature information may be linked to. Therefore, the dual authentication of the digital authentication information and the biological feature information is realized using the authentication factor. Thus, after the dual authentication, it may be determined that the biological feature information and the digital authentication information are from a same user, to ensure legality of the user.

In block S106, the payee device receives the authentication information transmitted by the payer device through the communication connection. During a duration when the biological body is within the predetermined rang of the payee device, the biological feature information of the biological body is collected.

The biological feature information includes at least one of: fingerprint information, iris information, facial information and vein information. In embodiments, the payee device collects the biological feature information of the human body while receiving the authentication information sent by the payer device. For example, during a short time duration (such as 3 seconds) when the user touches a touch component of the POS machine with his finger, the communication connection is established, by aid of the human body, between the POS machine and the wrist-watch worn by the user. The authentication information is transmitted through the communication connection established while the touch component of the POS machine collects the fingerprint information. As another example, during a duration when the communication connection is established between the wrist-watch worn by the user and a payment terminal installing an Alipay application (the payment terminal has a capability of photographing for use of collecting the facial information), the facial information is collected through the payment terminal. Therefore, both of the authentication information and the biological feature information may be simultaneously acquired by the payee device at once, making operations easy and convenient.

In embodiments, it is possible to collect the biological feature information during the duration when the biological body enters the predetermined range of the payee device. The biological feature information may be collected before, when or after the communication connection is established.

In this block, particularly, in a case that it is required to contact the biological body with the payee device to collect the biological feature information, as an alternative implementation, the biological feature information includes the fingerprint information and/or the vein information. Collecting the biological feature information of the biological body includes when the biological body contacts with the payee device, collecting the biological feature information of a portion that the biological body touches the payee device.

In related arts, with a method of inputting a fingerprint and a PIN code on the POS machine, the user is informed by the POS machine to input the fingerprint information, such that the fingerprint information is collected. The user is then informed to input the PIN code. Therefore, two interactions between the user and the POS machine are required to input the fingerprint information and the PIN code, which is relatively cumbersome. Compared with the above-mentioned method, in the present disclosure, only one interaction is required from the perspective of the user to input the authentication information and collect the biological feature information simultaneously at once, which is easy and convenient.

In block S107, an authentication result of authenticating the digital authentication information and the biological feature information is acquired.

In embodiments, the authentication result of authenticating the digital authentication information and the biological feature information includes an authentication result of authenticating the digital authentication information using the authentication factor and an authentication result of authenticating the biological feature information using biological feature verification information after acquiring the authentication factor and the biological feature verification information based on the authentication identification information. The authentication factor mainly includes verification information of verifying the digital authentication information. The authentication factor and the biological feature verification information are uniquely linked to the authentication identification information. Therefore, the authentication factor and the biological feature verification information both corresponding to the user may be uniquely determined based on the authentication identification information, such that the legality of the user may be ensured after the dual authentication of the digital authentication information and the biological feature information are successful.

In this block, authenticating the digital authentication information using the authentication factor at least includes one of the followings.

Manner one is the asymmetric authentication manner. In this manner, the digital authentication information includes the electronic signature information, and the authentication factor includes the public key for verifying the electronic signature information.

Alternatively, manner two is the symmetric authentication manner. In this manner, the digital authentication information includes encrypted information obtained by performing a calculation using the symmetric key, and the authentication factor includes the symmetric key.

Alternatively, manner three is the token-based authentication manner. In this manner, the digital authentication information includes the one-time password, and the authentication factor includes a seed key for verifying the one-time password.

The above three manners for authenticating the digital authentication information are described in block S105, which are not elaborated herein.

In this block, authenticating the digital authentication information using the authentication factor and authenticating the biological feature information using the biological feature verification information includes the followings. The digital authentication information is authenticated using the authentication factor and it is judged whether a match ratio between the biological feature verification information and the biological feature information is greater than a first predetermined value. When the match ratio between the biological feature verification information and the biological feature information is greater than the first predetermined value, and the digital authentication information is successfully authenticated, it is determined that the authentications of the authentication information and the biological feature information are successful.

The first predetermined value is less than a second predetermined value which is used to indicate a match ratio that two pieces of biological feature information are identical to each other. In practical implementations, the second predetermined value may be in theory a similarity degree required when the two pieces of biological feature information are entirely identical to each other, such as 99%. Since the first predetermined value may be less than the second predetermined value, a probability that an actually legal user is identified unsuccessfully in the biological feature information authentication technology may be reduced by decreasing the match ratio.

In related arts, it is possible to identify the actually legal user unsuccessfully and to identify an illegal user successfully with the biological feature information authentication technology. Taking the fingerprint recognition as an example, in one case, the fingerprint of the user is generally legal. However, the fingerprint is identified unsuccessfully by the authentication device and is identified as a fake fingerprint by mistake. As a result, the authentication is unsuccessful and the payment transaction may not be done. In another case, the fingerprint of an illegal user is authenticated successfully by the authentication device even if the fingerprint is fake, causing economic losses subjected by the user. In addition, the probability of the latter case is generally very high. With the embodiments, the dual authentication of the digital authentication information and the biological feature information may avoid a case that the illegal user is identified successfully, and may reduce the probability that the actually legal user is identified unsuccessfully. It may be determined that a user is legal by authenticating the digital authentication information in the above three manners, since the digital authentication information cannot identified successfully for the illegal user. Therefore, the authentication of the fake fingerprint may be avoided, and the case that the illegal user is identified successfully may be avoided. When the user is legal, the authentication device may reduce the similar degree of matching the two pieces biological feature information to each other, so as to reduce the probability of unsuccessfully identifying the actually legal user. For example in theory, w en the two pieces of biological feature information are matched to each other, the similarity degree is at least 99% (the second predetermined value). Therefore, if the similarity degree acquired by the authentication device is only 90%, the two pieces of biological feature information are identified as mismatched. That is, the authentication is unsuccessful, and the case that the true fingerprint is identified as the fake fingerprint occurs. In the present disclosure, since it may be ensured that the user is legal through the authentication of the digital authentication information, the similarity degree required for determining that the two pieces of biological feature information are matched to each other may be reduced to 80% (the first predetermined value) from the similarity degree required for completely matching. That is to say, when the similarity degree is 80% (the first predetermined value), it may be determined that the two pieces of biological feature information are matched to each other. Therefore, when the similarity degree between the two pieces of biological feature information is 90%, the authentication is successful. Thus, the case that the actually legal user is identified unsuccessfully may be avoided, thereby decreasing the probability of identifying the actually legal user unsuccessfully with the biological feature information authentication technology.

In block S108, the payee device preforms the payment transaction when the authentication result is a successful authentication.

With the payment method provided in embodiments, the transaction information and the to-be-authenticated information are transmitted with the intra-body communication, and the payment is done after the to-be-authenticated information is authenticated successful. From the perspective of the user, only a single operation is performed. The digital authentication information and the biological feature information may be acquired simultaneously by the payee device, which is easy and convenient. The dual authentication of the digital authentication information and the biological feature information may be safer and more reliable, which reduces the probability that the actually legal user is identified unsuccessfully, thereby improving user experience.

Figure 2:
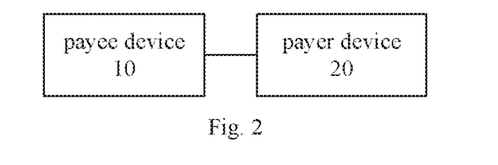
FIG. 2 is a structural schematic diagram illustrating a payment system provided in embodiment 2 of the present disclosure.

Embodiments of the present disclosure provide a payment system. As illustrated in FIG. 2, the payment system includes a payee device 10 and a payer device 20.

The payee device 10 is configured to establish a communication connection with the payer device 20 through a biological body when the biological body enters a predetermined range of the payee device 10, and to send transaction information to the payer device 20 through the communication connection. The payer device 20 is configured to receive the transaction information, to extract key information from the transaction information, to prompt the key information, and to wait for a confirmation from the user. After a confirmation instruction is received from the user, the payer device 20 is configured to send authentication information to the payee device 10 through the communication connection. The payee device 10 is further configured to receive the authentication information sent by the payer device 20 through the communication connection. During a duration when the biological body is within the predetermined range of the payee device 10, the payee device 10 is further configured to collect biological feature information of the biological body. The payee device 10 is further configured to acquire an authentication result of authenticating digital authentication information and the biological feature information, and to perform the payment transaction when the authentication result is a successful authentication.

With the payment system provided in embodiments, the transaction information and the to-be-authenticated information are transmitted with the intra-body communication, and the payment is done after the to-be-authenticated information is authenticated successful. From the perspective of the user, only a single operation is performed. The digital authentication information and the biological feature information may be acquired simultaneously by the payee device, which is easy and convenient. The dual authentication of the digital authentication information and the biological feature information may be safer and more reliable, which reduces the probability that the actually legal user is identified unsuccessfully, thereby improving user experience.

In embodiments, the biological body generally refers to a human body. The payee device may be a payment terminal connected with a background via network, such as a POS machine, a code scanning terminal having an Alipay application, a mobile terminal, a PDA, a desktop computer, a laptop computer or the like. The payer device may be a device inserted into the human body, a device worn on the human body or a device placed in clothes worn by the human body. The device inserted into the human body may be for example a blood flow transducer, a pulse transducer, a body temperature transducer or the like. The device worn on the human body may be for example an electronic device wearable on the human body, such as a wrist strap, a wrist-watch, a necklace, a ring, a belt or the like. When the payer device is the device worn on the human body, a distance between the payer device and the surface of the human body (such as skin) is restricted to be within a predetermined distance (such as several millimeters), even though the payer device does not directly contact with the surface of the human body, to ensure a quality of communication when the payment device placed within the predetermined range communicates with the human body. The body area network (BAN for short) is a communication network centered to the human body and consisted of network elements related to the human body (including a personal terminal, transducers arranged on the human body, in the clothes, within a range from the human body (such as 3-5 meters), or even inside the human body, or networking equipment). Therefore, when a network element related to the human body enters the predetermined range of the payee device, the communication connection based on the body area network may be established.

As an alternative implementation of embodiments, the payee device 10 is configured to establish a communication connection with the payer device 20 through the biological body in a wired manner and in a wireless manner. Specifically, the establishing may be implemented in at least one of the wired manner and the wireless manner.

Wired manner is described as follows.

Electrodes are arranged in both the payee device 10 and the payer device 20. When the payee device 10 contacts with the biological body (such as the human body) where the payer device 20 is inserted in the human body or worn on the human body (for example, the user wearing the wrist-watch contacts with the POS machine using his finger), the human body is used as a conductor to form a conductive path inside the human body by connecting the electrodes of the payee device 10 and the payer device 20. That is, the communication connection is established in the wired manner. In this manner, the payee device 10 needs to contacts with the human body carrying the payer device 20.

Wireless manner is described as follows.

In the wireless manner, both of the payee device 10 and the payer device (such as the POS machine and the wrist-watch) may detect whether an electric field changes. When one of the payee device 10 and the payee device 20 enters an allowable range of the intra-body communication, the other one may detect a change in field strength of the electric field and establish the communication connection therewith. Specifically, taking the payer device 20 as an example, the payer device 20 is worn on the human body or inserted in the human body, and an electric field is generated due to oscillation of a transmitter of the payer device 20. When a distance between the payer device 20 and the payee device 10 is within the allowable range of the intra-body communication, a receiver of the payee device 10 may detect a change in the electric field, and establish the communication connection with the payer device 20. In this manner, the payee device 10 does not need to contact with the human body carrying the payer device 20.

The above manners utilize the human body as a transmission medium of an electrical signal, realizing the information interaction among devices arranged at the surface of the body, in the body and near the body (such as within 3 to 5 meters from the human body). Compared with the conventional wireless communication technologies, such as Bluetooth, WIFI, RF, infrared communications or the like, signals are less susceptible of electromagnetic noise when transmitting through the body during the intra-body communication, thereby having low power consumption, high confidentiality and lower damage on the body. In addition, without a reduced efficiency caused by a multi-parties communication, a redundant wired connection inherent in a wired communication method can be avoided.

In embodiments, the transaction information may include transaction amounts, payee account information and payer account information. When a high amount occurs in the transaction, the payee device 10 needs to send the transaction information to the payer device 20, to inform the user of the transaction information. After the user confirms the transaction information, the payment flow may be preceded. In addition, in practical implementations, the payer device may be a single device, such as a wrist-watch, or may include two separate devices, such as the wrist-watch and an electronic signature device (such as a Key Token of Industrial and Commercial Bank of China, a Key Token of Agricultural Bank of China or a smart card having signature function).

In embodiments, the payer device 20 may extract the key information (such as transaction amount, a name of the payee device, a name of the payer device, or the like) from the transaction information, without the requirement of prompting the entire transaction information. Specifically, prompting the key information may be done by displaying it on a display screen or by playing it in voice. Particularly, a limitation that it is unable to display the entire transaction information due to a small display screen of a miniature device having the small display screen (for example the wrist-watch having the small display screen) may be overcome. As long as the key information is displayed, it may be realized to inform the user.

In embodiments, the payer device 20 is further configured to inform the user of the key information. By adding a confirmation step from the user, safety of the transaction may be improved. After the confirmation from the user by pressing a confirmation key via the user, subsequent operations may be operated. Particularly, when the payer device includes two separate devices, informing the user may be implemented by prompting the key information on any one of the two separate devices, certainly preferably, prompting on the electronic signature device.

In embodiments, the authentication information includes digital authentication information. The digital authentication information includes at least one of electronic signature information, encrypted information and one-time password. The electronic signature information is signature data obtained by signing to-be-signed data via the payer device 20 using its privacy key. The to-be-signed data includes one-time authentication data, authentication identification information and the like. When the electronic signature information is authenticated, a public key of the payer device 20 is acquired, and the electronic signature information is verified using the public key. When the electronic signature information is verified successfully, it is indicated that the authentication is successful. The above method for authentication is called as an asymmetric authentication method. The encrypted information is a MAC value obtained by calculating to-be-encrypted data via the payer device 20 using a symmetric key negotiated with the payee device 10. When the encrypted information is authenticated, a verified MAC value is obtained by calculating the to-be-encrypted data using a symmetric key and the verified MAC value is compared with the encrypted information. When the encrypted information is identical to the verified MAC value, the authentication is successful. The above method for authentication is called as a symmetric authentication method. The one-time password is ciphertext generated by a one-time password generator (OTP for short) based on a seed key. When the one-time password is authenticated, a verified value is obtained by performing a calculation using the seed key, and the verified value is compared with the one-time password. When the one-time password is identical to the verified value, it is indicated that the authentication is successful. The above method for authentication is called as a token-based authentication method. In embodiments, the authentication of the digital authentication information may be realized in any one of above-mentioned three methods, to ensure legality of the payer device 20.

In embodiments, as an alternative implementation, the authentication information may further include authentication identification information. The authentication identification information may be for example a device identification of the payer device 20, a user identity (ID) or other information that may uniquely identify the user. Through the authentication identification information, an authentication factor which is used for authenticating the digital authentication information and the biological feature information may be linked to. Therefore, the dual authentication of the digital authentication information and the biological feature information is realized using the authentication factor. Thus, after the dual authentication, it may be determined that the biological feature information and the digital authentication information are from a same user, to ensure legality of the user.

In embodiments, the payee device 10 is further configured to collect the biological feature information of the biological body during duration when the biological body is within the predetermined rang of the payee device 10. The biological feature information includes at least one of: fingerprint information, iris information, facial information and vein information. In embodiments, the payee device 10 collects the biological feature information of the human body while receiving the authentication information sent by the payer device 20. For example, during a short time duration (such as 3 seconds) when the user touches a touch component of the POS machine with his finger, the communication connection is established, by aid of the human body, between the POS machine and the wrist-watch worn by the user. The authentication information is transmitted through the communication connection established while the touch component of the POS machine collects the fingerprint information. As another example, during a duration when the communication connection is established between the wrist-watch worn by the user and a payment terminal installing an Alipay application (the payment terminal has a capability of photographing for use of collecting the facial information), the facial information is collected through the payment terminal. Therefore, both of the authentication information and the biological feature information may be simultaneously acquired by the payee device 10 at once, making operations easy and convenient.

In embodiments, it is possible to collect the biological feature information during the duration when the biological body enters the predetermined range of the payee device. The biological feature information may be collected before, when or after the communication connection is established.

Particularly, in a case that it is required to contact the biological body with the payee device 10 to collect the biological feature information, as an alternative implementation, the biological feature information includes the fingerprint information and/or the vein information. Collecting by the payee device 10 the biological feature information of the biological body includes when the biological body contacts with the payee device 10, collecting by the payee device 10 the biological feature information of a portion that the biological body touches the payee device 10.

In related arts, with a method of inputting a fingerprint and a PIN code on the POS machine, the user is informed by the POS machine to input the fingerprint information, such that the fingerprint information is collected. The user is then informed to input the PIN code. Therefore, two interactions between the user and the POS machine are required to input the fingerprint information and the PIN code, which is relatively cumbersome. Compared with the above-mentioned method, in the present disclosure, only one interaction is required from the perspective of the user to input the authentication information and collect the biological feature information simultaneously at once, which is easy and convenient.

In embodiments, the authentication result of authenticating the digital authentication information and the biological feature information includes an authentication result of authenticating the digital authentication information using the authentication factor and an authentication result of authenticating the biological feature information using biological feature verification information after acquiring the authentication factor and the biological feature verification information based on the authentication identification information. The authentication factor mainly includes biological feature verification information and verification information of verifying the digital authentication information. The authentication factor is uniquely linked to the authentication identification information. Therefore, the authentication factor corresponding to the user may be uniquely determined based on the authentication identification information, such that the legality of the user may be ensured after the dual authentication of the digital authentication information and the biological feature information is successful.

In an alternative implementation of embodiments, authenticating the digital authentication information using the authentication factor at least includes one of the followings.

Manner one is the asymmetric authentication manner. In this manner, the digital authentication information includes the electronic signature information, and the authentication factor includes the public key for verifying the electronic signature information.

Alternatively, manner two is the symmetric authentication manner. In this manner, the digital authentication information includes encrypted information obtained by performing a calculation using the symmetric key, and the authentication factor includes the symmetric key.

Alternatively, manner three is the token-based authentication manner. In this manner, the digital authentication information includes the one-time password, and the authentication factor includes a seed key for verifying the one-time password.

The above three manners for authenticating the digital authentication information are described already, which are not elaborated herein.

As an alternative implementation, authenticating the digital authentication information using the authentication factor and authenticating the biological feature information using the biological feature verification information includes the followings. The digital authentication information is authenticated using the authentication factor and it is judged whether a match ratio between the biological feature verification information and the biological feature information is greater than a first predetermined value. When the match ratio between the biological feature verification information and the biological feature information is greater than the first predetermined value, it is determined that the authentications of the authentication information and the biological feature information are successful. As another alternative implementation, authenticating the digital authentication information and the biological feature information using the authentication factor includes the followings. The digital authentication information is authenticated using the authentication factor. After the authentication is successful, it is judged whether a match ratio between the biological feature verification information and the biological feature information is greater than the first predetermined value. When the match ratio between the biological feature verification information and the biological feature information is greater than the first predetermined value, it is determined that the authentications of the authentication information and the biological feature information are successful.

The first predetermined value is less than a second predetermined value which is used to indicate a match ratio that two pieces of biological feature information are identical to each other.

In practical implementations, the second predetermined value may be in theory a similarity degree required when the two pieces of biological feature information are entirely identical to each other, such as 99%. Since the first predetermined value may be less than the second predetermined value, a probability that an actually legal user is identified unsuccessfully in the biological feature information authentication technology may be reduced by decreasing the match ratio.

In related arts, it is possible to identify the actually legal user unsuccessfully and to identify an illegal user successfully with the biological feature information authentication technology. Taking the fingerprint recognition as an example, in one case, the fingerprint of the user is generally legal. However, the fingerprint is identified unsuccessfully by the authentication device and is identified as a fake fingerprint by mistake. As a result, the authentication is unsuccessful and the payment transaction may not be done. In another case, the fingerprint of an illegal user is authenticated successfully by the authentication device even if the fingerprint is fake, causing economic losses subjected by the user. In addition, the probability of the latter case is generally very high. With the embodiments, the dual authentication of the digital authentication information and the biological feature information may avoid a case that the illegal user is identified successfully, and may reduce the probability that the actually legal user is identified unsuccessfully. It may be determined that a user is legal by authenticating the digital authentication information in the above three manners, since the digital authentication information cannot identified successfully for the illegal user. Therefore, the authentication of the fake fingerprint may be avoided, and the case that the illegal user is identified successfully may be avoided. When the user is legal, the authentication device may reduce the similar degree of matching the two pieces biological feature information to each other, so as to reduce the probability of unsuccessfully identifying the actually legal user. For example in theory, when the two pieces of biological feature information are matched to each other, the similarity degree is at least 99% (the second predetermined value). Therefore, if the similarity degree acquired by the authentication device is only 90%, the two pieces of biological feature information are identified as mismatched. That is, the authentication is unsuccessful, and the case that the true fingerprint is identified as the fake fingerprint occurs. In the present disclosure, since it may be ensured that the user is legal through the authentication of the digital authentication information, the similarity degree required for determining that the two pieces of biological feature information are matched to each other may be reduced to 80% (the first predetermined value) from the similarity degree required for completely matching. That is to say, when the similarity degree is 80% (the first predetermined value), it may be determined that the two pieces of biological feature information are matched to each other. Therefore, when the similarity degree between the two pieces of biological feature information is 90%, the authentication is successful. Thus, the case that the actually legal user is identified unsuccessfully may be avoided, thereby decreasing the probability of identifying the actually legal user unsuccessfully with the biological feature information authentication technology.

With the payment system provided in embodiments, the transaction information and the to-be-authenticated information are transmitted with the intra-body communication, and the payment is done after the to-be-authenticated information is authenticated successful. From the perspective of the user, only a single operation is performed. The digital authentication information and the biological feature information may be acquired simultaneously by the payee device, which is easy and convenient. The dual authentication of the digital authentication information and the biological feature information may be safer and more reliable, which reduces the probability that the actually legal user is identified unsuccessfully, thereby improving user experience.

Embodiments of the present disclosure provide a computer program. When the computer program is running on a processor, the above payment authentication device is performed.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "example," "a specific example," or "some examples," means that a particular feature, structure, material, or characteristic described in connection with the embodiment or example is included in at least one embodiment or example of the present disclosure. Thus, the exemplary descriptions of the phrases are not necessarily referring to the same embodiment or example of the present disclosure. Furthermore, the particular features, structures, materials, or characteristics may be combined in any suitable manner in one or more embodiments or examples.

Although embodiments of the present disclosure have been shown and described, it would be understood that the above embodiments are exemplary and cannot be construed to limit the present disclosure, and those skilled in the art can make changes, alternatives, replacements and modifications in the embodiments without departing from principles and scope of the present disclosure. The scope of the present disclosure is defined by the claims and their equivalents.

What is claimed is:

1. A payment method, comprising:
after a biological body enters a predetermined range of a payee device, establishing by the payee device, a communication connection with a payer device through the biological body;
sending by the payee device, transaction information to the payer device through the communication connection;
receiving by the payer device, the transaction information;
extracting by the payer device, key information from the transaction information;
prompting by the payer device, the key information;
after receiving by the payer device, a confirmation instruction from the user, sending by the payer device, authentication information to the payee device through the communication connection, the authentication information comprising digital authentication information and authentication identification information, the authentication identification information being information that uniquely identifies the user, and linking an authentication factor for authenticating the digital authentication information, and biological feature verification information for authenticating biological feature information to the user uniquely;
receiving by the payee device, the authentication information sent by the payer device through the communication connection;
during a duration when the biological body is within the predetermined range of the payee device, collecting by the payee device, biological feature information of the biological body;
acquiring by the payee device, the authentication factor and the biological feature verification information based on the authentication identification information;
authenticating, by the payee device, the digital authentication information using the authentication factor and authenticating the biological feature information using biological feature verification information, to obtain authentication results; and
performing by the payee device, a payment transaction when the authentication results are successful authentications;
wherein, authenticating, by the payee device, the digital authentication information using the authentication factor and authenticating the biological feature information using biological feature verification information, comprises:
authenticating the digital authentication information using the authentication factor, and judging whether a match ratio between the biological feature verification information and the biological feature information is greater than a first predetermined value; and when the digital authentication information is successfully authenticated, and the match ratio between the biological feature verification information and the biological feature information is greater than the first predetermined value, determining that the authentications of the authentication information and the biological feature information are successful, wherein, the first predetermined value is less than a second predetermined value which is used to indicate a match ratio that two pieces of biological feature information are identical to each other.

2. The payment method according to claim 1, wherein, the biological feature information comprises fingerprint information and/or vein information; and collecting, by the payee device, the biological feature information of the biological body comprises: when the biological body contacts with the payee device, collecting by the payee device, the biological feature information of a portion where the biological body contacts with the payee device.

3. The payment method according to claim 1, wherein, the digital authentication information comprises at least one of: electronic signature information, encrypted information and one-time password.

4. The payment method according to claim 3, wherein, the electronic signature information is signature data obtained by signing to-be-signed data via the payer device using its privacy key;

the encrypted information is a MAC value obtained via the payer device by performing calculation on data to be encrypted using a symmetric key negotiated with the payee device; and the one-time password is ciphertext generated by a one-time password generator based on a seed key.

5. The payment method according to claim 1, wherein the communication connection is established in a wired manner or in a wireless manner.

6. The payment method according to claim 1, wherein the transaction information comprises a transaction amount, payer account information and payee account information, and the key information comprises the transaction amount, a name of the payer device and a name of the payee device.

7. The payment method according to claim 1, wherein prompting the key information comprises:

displaying the key information on a display screen and/or playing the key information in voice.

8. A payment system, comprising a payee device and a payer device, wherein the payee device is configured to establish a communication connection with the payer device through a biological body when the biological body enters a predetermined range of the payee device, and to send transaction information to the payer device through the communication connection;

the payer device is configured to receive the transaction information, to extract key information from the transaction information, to prompt the key information, and to send authentication information to the payee device through the communication connection after receiving a confirmation instruction from a user;

the payee device is further configured to receive the authentication information sent by the payer device through the communication connection, the authentication information comprising digital authentication information and authentication identification information, the authentication identification information being information that uniquely identifies the user, and linking an authentication factor for authenticating the digital authentication information, and biological feature verification information for authenticating biological feature information to the user uniquely;

collect biological feature information of the biological body during a duration when the biological body is within the predetermined range of the payee device, to acquire an authentication result of authenticating the digital authentication information and the biological feature information;

acquire the authentication factor and the biological feature verification information based on the authentication identification information;

authenticate the digital authentication information using the authentication factor, and authenticate the biological feature information using biological feature verification information, to obtain authentication results; and perform a payment transaction when the authentication result is a successful authentication;

wherein, authenticating, by the payee device, the digital authentication information using the authentication factor and authenticating the biological feature information using biological feature verification information, comprises:

authenticating the digital authentication information using the authentication factor, and judging whether a match ratio between the biological feature verification information and the biological feature information is greater than a first predetermined value; and when the digital authentication information is successfully authenticated, and the match ratio between the biological feature verification information and the biological feature information is greater than the first predetermined value, determining that the authentications of the authentication information and the biological feature information are successful, wherein, the first predetermined value is less than a second predetermined value which is used to indicate a match ratio that two pieces of biological feature information are identical to each other.

9. The payment system according to claim 8, wherein, the biological feature information comprises: fingerprint information and/or vein information;

the payee device is further configured to collect the biological feature information of the biological body by acts of: when the biological body contacts with the payee device, collecting by the payee device, the biological feature information of a portion where the biological body contacts with the payee device.

10. The payment system according to claim 8, wherein, the digital authentication information comprises at least one of: electronic signature information, encrypted information and one-time password.

11. The payment system according to claim 10, wherein, the electronic signature information is signature data obtained by signing to-be-signed data via the payer device using its privacy key; the encrypted information is a MAC value obtained via the payer device by performing calculation on data to be encrypted using a symmetric key negotiated with the payee device; and the one-time password is ciphertext generated by a one-time password generator based on a seed key.

12. A computer program, wherein when the computer program is running on a processor, a payment method is executed, the payment method comprising:
- after a biological body enters a predetermined range of a payee device, establishing by the payee device, a communication connection with a payer device through the biological body;
- sending by the payee device, transaction information to the payer device through the communication connection;
- receiving by the payer device, the transaction information;
- extracting by the payer device, key information from the transaction information;
- prompting by the payer device, the key information;
- after receiving by the payer device, a confirmation instruction from the user,
- sending by the payer device, authentication information to the payee device through the communication connection, the authentication information comprising
- digital authentication information and authentication identification information, the authentication identification information being information that uniquely identifies the user, and linking an authentication factor for authenticating the digital authentication information, and biological feature verification information for authenticating biological feature information to the user uniquely;
- receiving by the payee device, the authentication information sent by the payer device through the communication connection;
- during a duration when the biological body is within the predetermined range of the payee device, collecting by the payee device, biological feature information of the biological body;
- acquiring by the payee device, the authentication factor and the biological feature verification information based on the authentication identification information; and
- performing by the payee device, a payment transaction when the authentication result is a successful authentication,
- wherein, authenticating, by the payee device, the digital authentication information using the authentication factor and authenticating the biological feature information using biological feature verification information, comprises:
- authenticating the digital authentication information using the authentication factor, and judging whether a match ratio between the biological feature verification information and the biological feature information is greater than a first predetermined value; and
- when the digital authentication information is successfully authenticated, and the match ratio between the biological feature verification information and the biological feature information is greater than the first predetermined value, determining that the authentications of the authentication information and the biological feature information are successful,
- wherein, the first predetermined value is less than a second predetermined value which is used to indicate a match ratio that two pieces of biological feature information are identical to each other.

13. The payment method according to claim 12, wherein authenticating the digital authentication information using the authentication factor comprises:
- authenticating the digital authentication information in an asymmetric authentication manner, wherein the digital authentication information comprises electronic signature information, and the authentication factor comprises a public key for verifying the electronic signature information; or
- authenticating the digital authentication information in a symmetric manner, wherein the digital authentication information comprises encrypted information obtained by performing a calculation using a symmetric key and the authentication factor comprises the symmetric key; or
- authenticating the digital authentication information in a token-based authentication manner, wherein the digital authentication information comprises a one-time password, and the authentication factor comprises a seed key for verifying the one-time password.

14. The computer program according to claim 12, wherein the biological feature information comprises fingerprint information and/or vein information; and
- collecting by the payee device, the biological feature information of the biological body comprises: when the biological body contacts with the payee device, collecting by the payee device, the biological feature information of a portion where the biological body contacts with the payee device.

15. The computer program according to claim 12, wherein, the digital authentication information comprises at least one of: electronic signature information, encrypted information and one-time password.

* * * * *